United States Patent
Guzman et al.

(10) Patent No.: US 12,553,376 B1
(45) Date of Patent: Feb. 17, 2026

(54) ENGINE COOLANT DRAINING DEVICE

(71) Applicants: George Guzman, Pomona, CA (US); Elvis Chinchilla, Inglewood, CA (US)

(72) Inventors: George Guzman, Pomona, CA (US); Elvis Chinchilla, Inglewood, CA (US)

(*) Notice: Subject to any disclaimer, the term of this patent is extended or adjusted under 35 U.S.C. 154(b) by 0 days.

(21) Appl. No.: 18/804,615

(22) Filed: Aug. 14, 2024

(51) Int. Cl.
*F01P 11/02* (2006.01)

(52) U.S. Cl.
CPC ................ *F01P 11/0276* (2013.01)

(58) Field of Classification Search
CPC .. F01P 11/0276; E03F 1/008; F01M 11/0408; F16L 27/12
See application file for complete search history.

(56) References Cited

U.S. PATENT DOCUMENTS

| | | | |
|---|---|---|---|
| 2,531,288 A | 11/1950 | Moore | |
| 2,751,787 A | 6/1956 | Porter | |
| 4,727,904 A | 3/1988 | Lease | |
| 5,323,813 A * | 6/1994 | Barrett | F16L 27/12 138/155 |
| 5,366,400 A * | 11/1994 | Kucik | B63J 4/00 210/DIG. 17 |
| 5,649,574 A * | 7/1997 | Turcotte | F01P 11/0204 165/95 |
| 6,003,635 A * | 12/1999 | Bantz | F01M 11/045 184/58 |
| 6,161,566 A | 12/2000 | Klamm | |
| 6,338,357 B1 | 1/2002 | Zevgolis | |
| 7,438,613 B2 | 10/2008 | Hubbs | |
| 7,992,600 B2 * | 8/2011 | Liu | F01P 11/0204 141/96 |
| 8,496,020 B1 * | 7/2013 | Westerberg | F01M 11/0408 137/15.14 |
| 8,800,966 B2 * | 8/2014 | Cordes | F01M 11/04 251/344 |
| D982,141 S | 3/2023 | Dillehay | |
| 2003/0106611 A1 * | 6/2003 | Shevela | F16N 3/08 141/382 |
| 2008/0233816 A1 * | 9/2008 | Sirmans | F01P 11/06 440/88 N |
| 2012/0012196 A1 * | 1/2012 | Gallo | B60R 15/00 137/234.6 |
| 2013/0048115 A1 * | 2/2013 | Wise | F01M 11/0408 137/561 R |

FOREIGN PATENT DOCUMENTS

WO    WO2021173275    9/2021

* cited by examiner

*Primary Examiner* — Timothy P. Kelly

(57) ABSTRACT

An engine coolant draining device for draining fluid coolant from an internal combustion engine includes a pipe which is attachable to a coolant drain on an internal combustion engine to receive a fluid coolant from the coolant drain. A valve is in fluid communication with the pipe to enable the fluid coolant to flow through the valve. The valve is positionable in a closed condition or an open condition thereby inhibiting or enabling the fluid coolant to flow through the valve. A hose is in fluid communication with the valve to receive the fluid coolant from the valve. The hose has a telescopically adjustable length thereby enabling the hose to be routed to a fluid receptacle for collecting the fluid coolant in the fluid receptacle without spilling.

9 Claims, 3 Drawing Sheets

ENGINE COOLANT DRAINING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to coolant draining devices and more particularly pertains to a new coolant draining device for draining fluid coolant from an internal combustion engine into a fluid receptacle without spilling. The device includes a pipe that is attachable to a coolant drain of an internal combustion engine and an elbow attached to the pipe and a valve attached to the elbow for either inhibiting or enabling a fluid coolant to flow through the valve. The device includes a hose with a telescopically adjustable length that is attached to the valve which can be routed into a fluid receptacle to enable the fluid coolant to be collected in the fluid receptacle without spilling.

(2) Description of Related Art Including Information Disclosed Under 37 CFR 1.97 and 1.98

The prior art relates to coolant draining devices including an extension drain device that includes a series of pipes which are pivotally attached together to enable to series of pipes to be oriented in a variety of orientations and a funnel attached to the series of pipes for collecting a fluid and a sampling tube device that includes a tube that can be fluidly coupled to a fluid source and a spring loaded drain valve and a coolant draining tool that includes a thermally insulated handle and a curved drain tube and a suction device for suctionally draining a fluid and a marine engine drain device that includes a plurality of drain tubes each coupled to a respective drain port on a marine engine and manifold to which the plurality of drain tubes are fluidly coupled to collect fluid drained from the marine engine. In no instance does the prior art disclose an engine coolant drain device that includes a pipe that is attachable to a coolant drain port on an internal combustion engine and a valve attached to the pipe for enabling or inhibiting a liquid coolant to flow through the valve and a hose with a telescopically adjustable length which can be routed into a fluid receptacle for collecting the liquid coolant without spilling.

BRIEF SUMMARY OF THE INVENTION

An embodiment of the disclosure meets the needs presented above by generally comprising a pipe which is attachable to a coolant drain on an internal combustion engine to receive a fluid coolant from the coolant drain. A valve is in fluid communication with the pipe to enable the fluid coolant to flow through the valve. The valve is positionable in a closed condition or an open condition thereby inhibiting or enabling the fluid coolant to flow through the valve. A hose is in fluid communication with the valve to receive the fluid coolant from the valve. The hose has a telescopically adjustable length thereby enabling the hose to be routed to a fluid receptacle for collecting the fluid coolant in the fluid receptacle without spilling.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
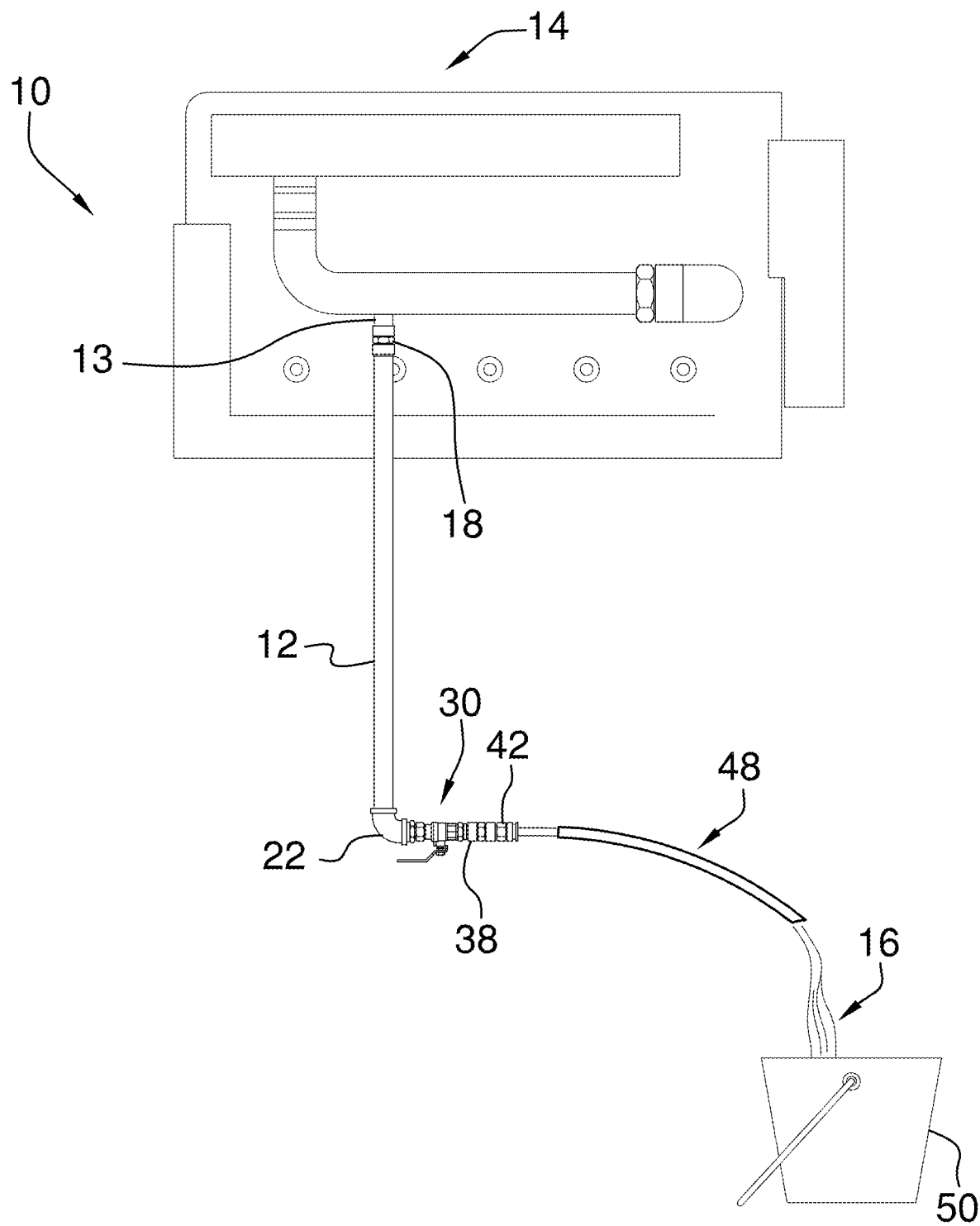
FIG. 1 is a perspective in-use view of an engine coolant draining device according to an embodiment of the disclosure.
Figure 2:
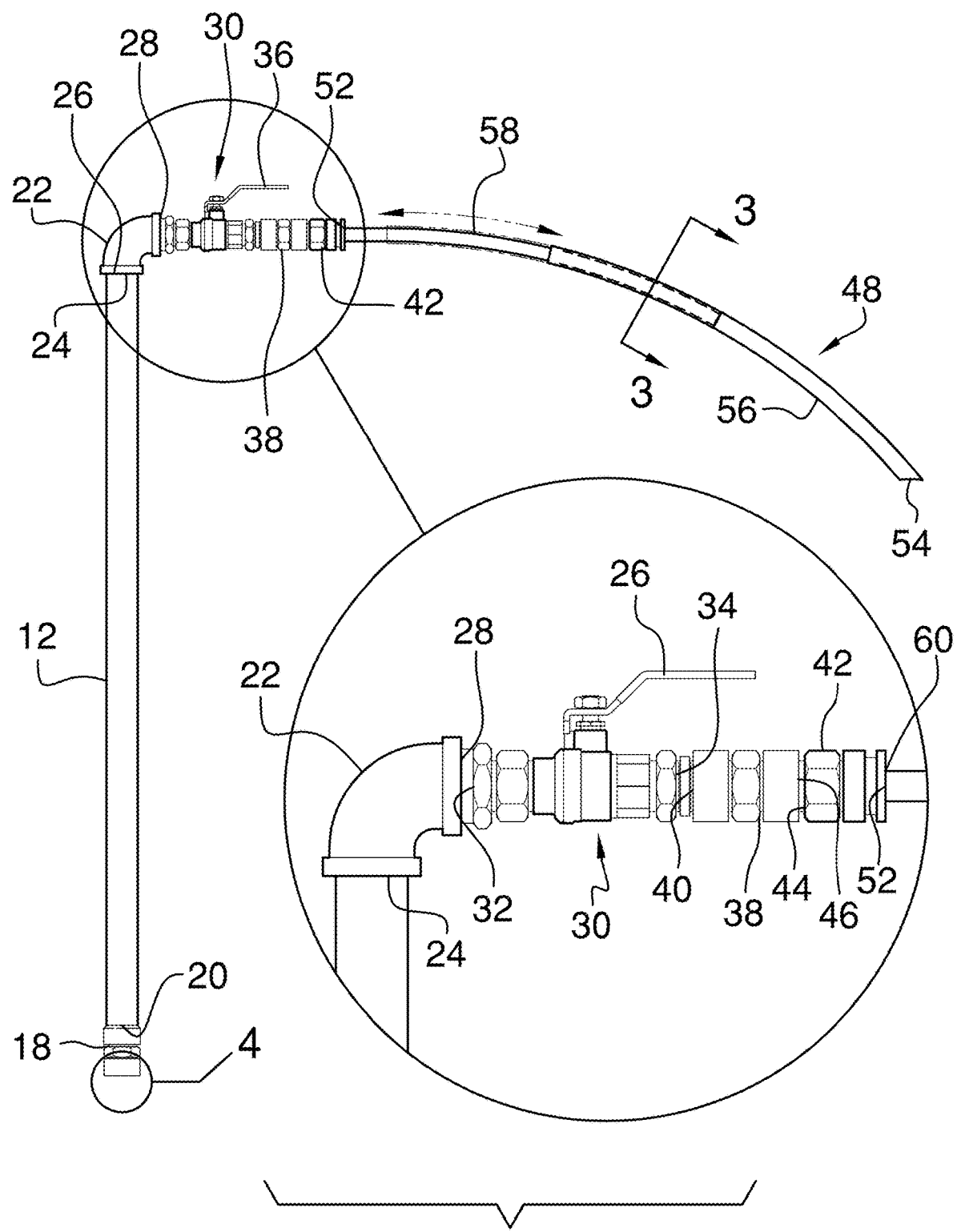
FIG. 2 is a perspective view of an embodiment of the disclosure.
Figure 3:
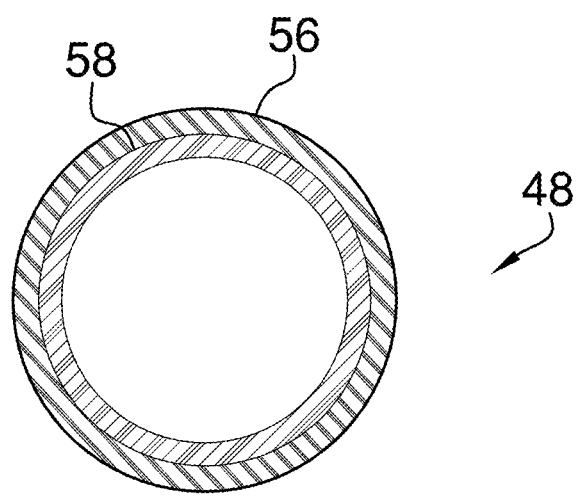
FIG. 3 is a cross sectional view taken along line 3-3 of FIG. 2 of an embodiment of the disclosure.
Figure 4:
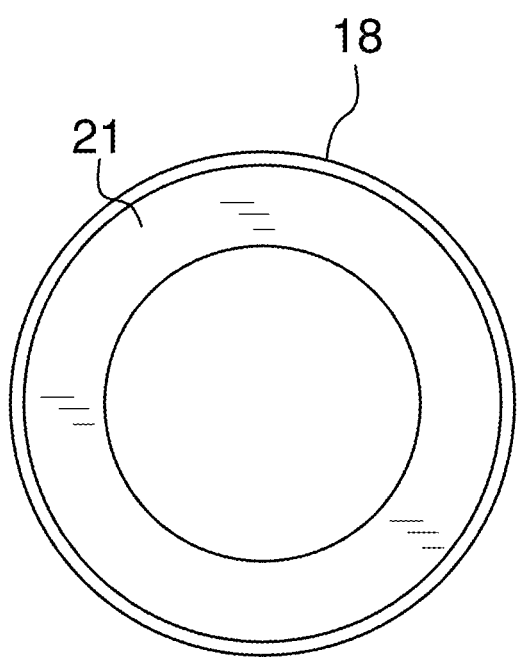
FIG. 4 is a magnified detail view taken from circle 4 of FIG. 2 of an embodiment of the disclosure.

With reference now to the drawings, and in particular to FIGS. 1 through 4 thereof, a new coolant draining device embodying the principles and concepts of an embodiment of the disclosure and generally designated by the reference numeral 10 will be described.

As best illustrated in FIGS. 1 through 4, the engine coolant draining device 10 generally comprises a pipe 12 which is attachable to a coolant drain 13 on an internal combustion engine 14 thereby enabling the pipe 12 to receive a fluid coolant 16 from the coolant drain 13. The internal combustion engine 14 may be an engine in a passenger vehicle, a cargo vehicle, an off road vehicle or any other type of vehicle that employs a liquid cooled internal combustion engine 14. A coupling fitting 18 is fluidly attached to a first end 20 of the pipe 12 and the coupling fitting 18 is matable to the coolant drain 13 thereby fluidly attaching the pipe 12 to the coolant drain 13. The coupling fitting 18 may be a female fluid fitting of any conventional design which is commonly employed in the convention of forming a fluid impermeable seal with a fluid source. As is most clearly shown in FIG. 4, a grommet 21 is positioned in the coupling fitting 18 and the grommet 21 is comprised of a resiliently compressible material, including but not being limited to rubber or silicone, to enable the grommet 21 to form a fluid impermeable seal with the coolant drain 13.

An elbow 22 is included which has a primary end 24 that is fluidly attached to a second end 26 of the pipe 12 thereby enabling the elbow 22 to receive the fluid coolant 16 from the pipe 12 when the coupling fitting 18 is mated to the coolant drain 13. The elbow 22 has a secondary end 28 and the elbow 22 is curved between the primary end 24 and the secondary end 28 thereby enabling the elbow 22 to have a direction of flow which is oriented perpendicular to the pipe 12. The elbow 22 may comprise a plumbing elbow of any conventional design that is commonly employed in the convention of plumbing and the pipe 12 may be a rigid pipe of any conventional design commonly employed in the convention of plumbing. Additionally, the pipe 12 may have a length ranging between approximately 25.0 cm and 60.0 cm.

A valve 30 is provided which has an input 32 that is in fluid communication with the pipe 12. The valve 30 is positionable in an open condition thereby placing an output 34 of the valve 30 in fluid communication with the pipe 12 thereby enabling the fluid coolant 16 to flow through the output 34. Conversely, the valve 30 is positionable in a closed condition thereby inhibiting fluid communication between the output 34 and the pipe 12 thereby inhibiting the fluid coolant 16 from flowing through the output 34. The valve 30 includes a lever 36 which is rotatably coupled to a body 37 of the valve 30 thereby enabling the lever 36 to be manipulated. The valve 30 is positioned in the closed condition when the lever 36 is rotated in a first direction and the valve 30 is positioned in the open condition when the lever 36 is rotated in a second direction. Furthermore, the input 32 of the valve 30 is fluidly coupled to the secondary end 28 of the elbow 22. The valve 30 may comprise a ball valve or other similar type of fluid flow valve commonly employed in the convention of plumbing.

A union fitting 38 is provided which has a first end 40 that is fluidly coupled to the output 34 of the valve 30. In this way the union fitting 38 can receive the fluid coolant 16 from the valve 30 when the valve 30 is positioned in the open condition. The union fitting 38 may comprise a plumbing fitting of any conventional design that is commonly employed for coupling different plumbing devices together to enable the pluming devices to be in fluid communication with each other. An air line fitting 42 is provided which has a first end 44 that is fluidly coupled to a second end 46 of the union fitting 38 to receive the fluid coolant 16 from the union fitting 38. The air line fitting 42 may be a compression fitting of any conventional design that is commonly employed to form a fluid impermeable union between a rigid conduit and a flexible conduit.

A hose 48 is provided that the hose 48 is in fluid communication with the valve 30 to receive the fluid coolant 16 from the valve 30 when the valve 30 is in the open condition. The hose 48 has a telescopically adjustable length thereby enabling the hose 48 to be routed to a fluid receptacle 50. In this way the hose 48 enables the fluid coolant 16 to be collected in the fluid receptacle 50 without spilling the fluid coolant 16. The fluid receptacle 50 may be a bucket or a funnel or any other type of fluid receptacle that is commonly employed to collect fluids from an internal combustion engine or other types of potentially toxic fluids.

The hose 48 has a coupled end 52 and a free end 54 and the hose 48 comprises a first portion 56 which slidably receives a second portion 58 thereby enabling the hose 48 to have the telescopically adjustable length. The first portion 56 is associated with the free end 54 and the second portion 58 is associated with the coupled end 52. The coupled end 52 is fluidly coupled to a second end 60 of the air line fitting 42 thereby enabling the hose 48 to receive the fluid coolant 16 from the air line fitting 42. The first portion 56 is slidable toward or away from the coupled end 52 of the hose 48 thereby either decreasing or increasing a length of the hose 48. In this way the hose 48 can extend between the air line fitting 42 and the fluid receptacle 50. The hose 48 is comprised of a flexible and fluid impermeable material, including but not being limited to rubber or silicone.

In use, the lever 36 on the valve 30 is rotated in the first direction to position the valve 30 in the closed condition and the coupling fitting 18 is fluidly attached to the coolant drain 13 on the internal combustion engine 14. The first portion 56 of the hose 48 is adjusted to enable to the hose 48 to be extended into the fluid receptacle 50 and the lever 36 on the valve 30 is rotated in the second direction to position the valve 30 in the open condition. In this way the fluid coolant 16 in the internal combustion engine 14 is drained into the fluid receptacle 50 without spilling the fluid coolant 16. Thus, the fluid coolant 16 can be drained without spilling onto a floor and posing a slipping hazard as can commonly occur when draining fluids from an internal combustion engine 14. The lever 36 on the valve 30 is rotated in the second direction to position the valve 30 in the closed condition and the coupling fitting 18 is uncoupled from the coolant drain 13 on the internal combustion engine 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An engine coolant draining device for draining coolant from an engine into a receptacle without spillage, said device comprising:
   a pipe being attachable to a coolant drain on an internal combustion engine wherein said pipe is configured to receive a fluid coolant from said coolant drain;

a valve having an input being in fluid communication with said pipe, said valve being positionable in an open condition thereby placing an output of said valve in fluid communication with said pipe wherein said valve is configured to enable the fluid coolant to flow through said output, said valve being positionable in a closed condition thereby inhibiting fluid communication between said output and said pipe wherein said valve is configured to inhibit the fluid coolant from flowing through said output; and a hose being in fluid communication with said valve wherein said hose is configured to receive the fluid coolant from said valve when said valve is in said open condition, said hose having a telescopically adjustable length thereby enabling said hose to be routed to a fluid receptacle wherein said hose is configured to enable the fluid coolant to be collected in said fluid receptacle without spilling the fluid coolant, wherein:

said hose has a coupled end and a free end;

said hose comprising a first portion slidably receives a second portion thereby enabling said hose to have said telescopically adjustable length;

said first portion is associated with said free end; and said second portion is associated with said coupled end.

2. The device according to claim 1, wherein:

said device includes a coupling fitting being fluidly attached to a first end of said pipe; and said coupling fitting is matable to said coolant drain thereby fluidly attaching said pipe to said coolant drain.

3. The device according to claim 1, wherein:

said pipe has a first end;

said device includes an elbow having a primary end being fluidly attached to a second end of said pipe wherein said elbow is configured to receive the fluid coolant from said pipe when said coupling fitting is mated to said coolant drain;

said elbow has a secondary end; and said elbow is curved between said primary end and said secondary end thereby enabling said elbow to have a direction of flow being oriented perpendicular to said pipe.

4. The device according to claim 3, wherein:

said valve includes a lever being rotatably coupled to a body of said valve thereby enabling said lever to be manipulated;

said valve is positioned in said closed condition when said lever is rotated in a first direction;

said valve is positioned in said open condition when said lever is rotated in a second direction; and said input of said valve is fluidly coupled to said secondary end of said elbow.

5. The device according to claim 1, wherein:

said device includes a union fitting having a first end being fluidly coupled to said output of said valve wherein said union fitting is configured to receive the fluid coolant from said valve when said valve is positioned in said open condition; and said device includes an air line fitting having a first end being fluidly coupled to a second end of said union fitting wherein said air line fitting is configured to receive the fluid coolant from said union fitting.

6. The device according to claim 5, wherein said coupled end is fluidly coupled to a second end of said air line fitting, and said hose is configured to receive the fluid coolant from said air line fitting.

7. The device according to claim 6, wherein said first portion of said hose is slidable toward or away from said coupled end of said hose thereby either decreasing or increasing a length of said hose thereby enabling said hose to extend between said air line fitting and said fluid receptacle.

8. An engine coolant draining device for draining coolant from an engine into a receptacle without spillage, said device comprising:

a pipe being attachable to a coolant drain on an internal combustion engine wherein said pipe is configured to receive a fluid coolant from said coolant drain;

a coupling fitting being fluidly attached to a first end of said pipe, said coupling fitting being matable to said coolant drain thereby fluidly attaching said pipe to said coolant drain;

an elbow having a primary end being fluidly attached to a second end of said pipe wherein said elbow is configured to receive the fluid coolant from said pipe when said coupling fitting is mated to said coolant drain, said elbow having a secondary end, said elbow being curved between said primary end and said secondary end thereby enabling said elbow to have a direction of flow being oriented perpendicular to said pipe;

a valve having an input being in fluid communication with said pipe, said valve being positionable in an open condition thereby placing an output of said valve in fluid communication with said pipe wherein said valve is configured to enable the fluid coolant to flow through said output, said valve being positionable in a closed condition thereby inhibiting fluid communication between said output and said pipe wherein said valve is configured to inhibit the fluid coolant from flowing through said output, said valve including a lever being rotatably coupled to a body of said valve thereby enabling said lever to be manipulated, said valve being positioned in said closed condition when said lever is rotated in a first direction, said valve being positioned in said open condition when said lever is rotated in a second direction, said input of said valve being fluidly coupled to said secondary end of said elbow;

a union fitting having a first end being fluidly coupled to said output of said valve wherein said union fitting is configured to receive the fluid coolant from said valve when said valve is positioned in said open condition;

an air line fitting having a first end being fluidly coupled to a second end of said union fitting wherein said air line fitting is configured to receive the fluid coolant from said union fitting; and a hose being in fluid communication with said valve wherein said hose is configured to receive the fluid coolant from said valve when said valve is in said open condition, said hose having a telescopically adjustable length thereby enabling said hose to be routed to a fluid receptacle wherein said hose is configured to enable the fluid coolant to be collected in said fluid receptacle without spilling the fluid coolant, said hose having a coupled end and a free end, said hose comprising a first portion slidably receiving a second portion thereby enabling said hose to have said telescopically adjustable length, said first portion being associated with said free end, said second portion being associated with said coupled end, said coupled end being fluidly coupled to a second end of said air line fitting wherein said hose is configured to receive the fluid coolant from said air line fitting, said first portion being slidable toward or away from said coupled end of said hose thereby either decreasing or increasing a length of said hose thereby enabling said hose to extend between said air line fitting and said fluid receptacle.

9. A method of draining a fluid coolant from an internal combustion engine without spilling the fluid coolant, the steps of the method comprising:

manipulating a lever on a valve into a first direction thereby positioning said valve in a closed condition thereby enabling said valve to inhibit fluid flow through said valve, said valve being fluidly coupled to a pipe;

attaching a coupling fitting on said pipe to a coolant drain on an internal combustion engine wherein said pipe is configured to receive a fluid coolant from said coolant drain;

extending a hose with a telescopically adjustable length to a desired length thereby enabling said hose to be routed into a fluid receptacle, said hose being in fluid communication with said valve;

manipulating said lever on said valve into a second position thereby positioning said valve in an open condition wherein said valve is configured to enable the fluid coolant to flow through said valve and through said hose and subsequently collected in said fluid receptacle;

manipulating said lever on said valve into said first position thereby positioning said valve in said closed condition when the fluid coolant has fully drained from said internal combustion engine; and removing said coupling fitting from said coolant drain on said internal combustion engine.

\* \* \* \* \*